United States Patent Office 2,947,070
Patented Aug. 2, 1960

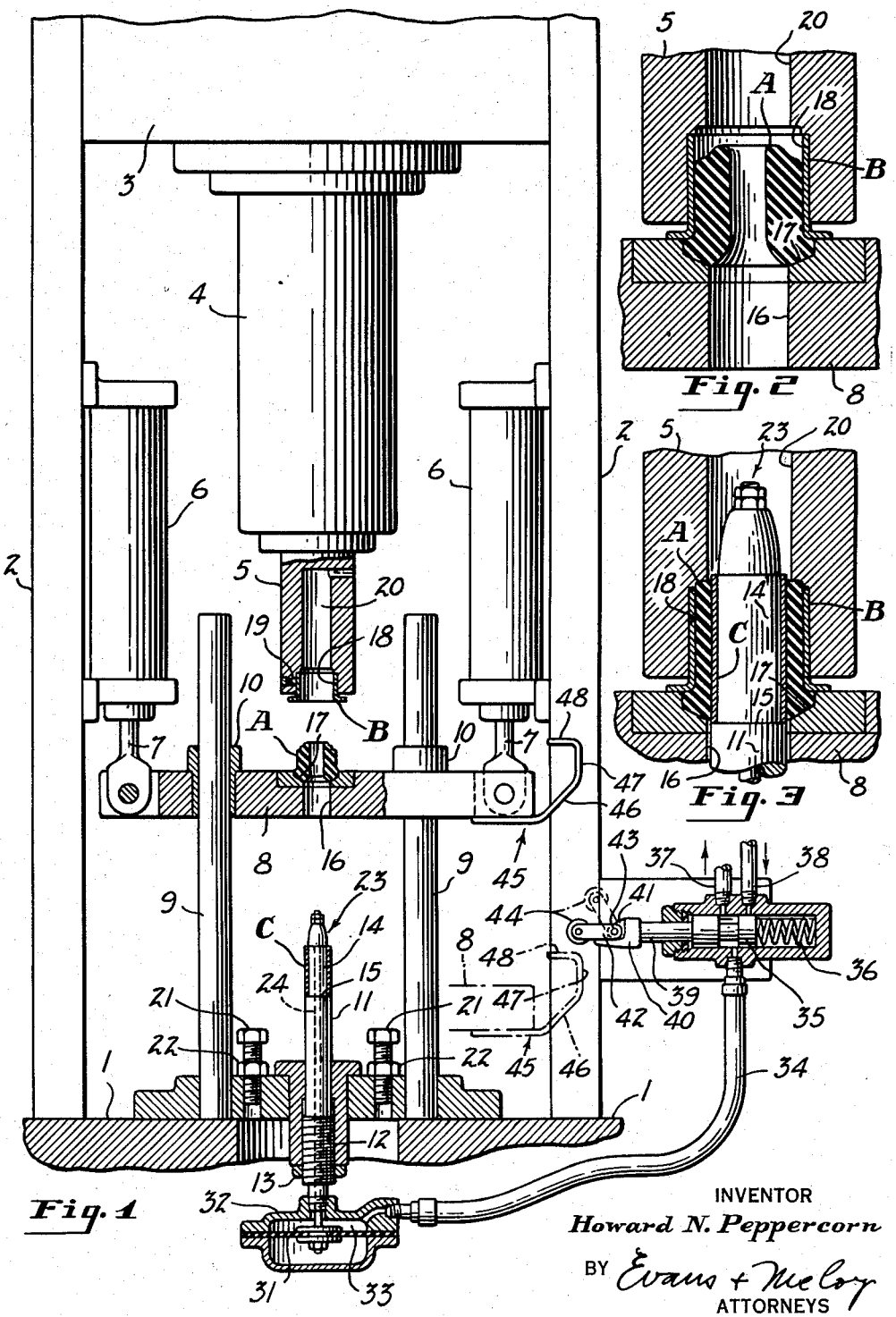

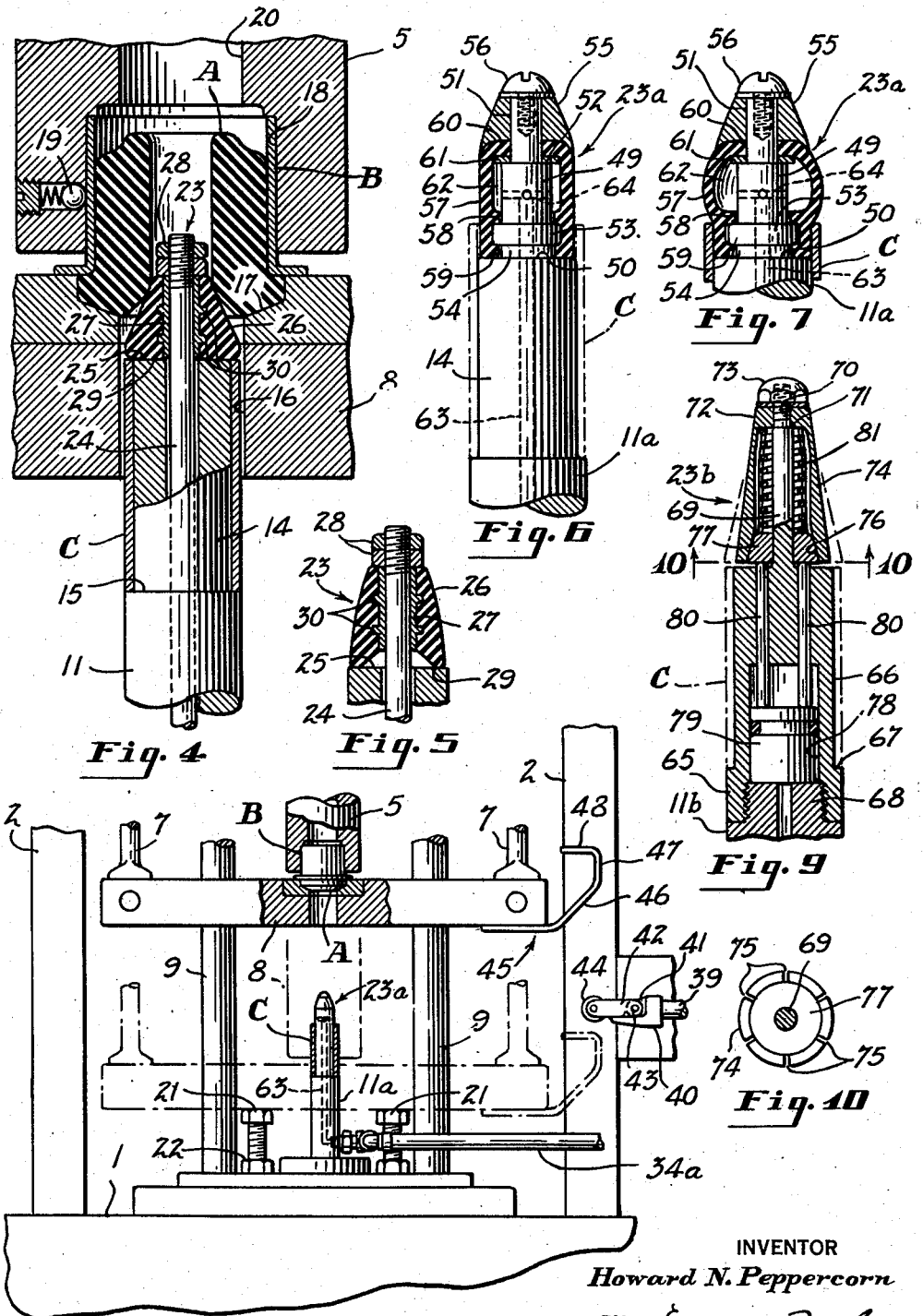

2,947,070

MACHINE FOR ASSEMBLING RESILIENT BUSH-
INGS OF THE RUBBER INSERT TYPE

Howard N. Peppercorn, Logansport, Ind., assignor to The
General Tire and Rubber Company, Akron, Ohio, a
corporation of Ohio Filed Feb. 15, 1954, Ser. No. 410,186

1 Claim. (Cl. 29—235)

This invention relates to machines for assembling resilient bushings of the type in which a tubular elastic rubber insert is interposed between an outer rigid sleeve and an inner rigid tubular core under sufficient radial compression to provide a strong frictional bond between the rubber insert and the sleeve and between the insert and the core.

The machine of the present invention includes a pair of opposed press members having means for supporting a sleeve and a rubber insert in axial alinement with each other between said members, the press members being relatively movable axially of the sleeve and insert to force the insert into the sleeve and to hold the same in position to be engaged by a core inserting plunger that is axially alined with the sleeve and insert. The core inserting plunger has an end portion upon which a tubular core slidably fits that is adapted to enter an elastic rubber insert held within a sleeve to position the core within the insert, the core inserting plunger having a pilot portion of tapering form that is normally of a diameter that will permit a tubular core to be moved over it onto or off the core supporting portion of the plunger and that is expansible during its movement through an insert to a diameter substantially the same as the external diameter of the core, so that the pilot expands the insert immediately in advance of the tubular core on the plunger so as to facilitate the entry of the core into the rubber insert.

Means is provided for subjecting the pilot to a thrust that will expand it during its passage through the rubber insert and for relieving the thrust after it has passed through the insert so that the pilot can be withdrawn with the core inserting plunger through the assembled insert.

In assembling machines heretofore in use a tapered insert expanding pilot detachably secured to the core was detached from the core after insertion of the core to permit withdrawal of the core inserting plunger. The object of the present invention is to provide an insert expanding pilot that is permanently attached to the core inserting plunger, that serves to expand the insert immediately in advance of the entering core and that will pass through the core on the return stroke of the plunger.

Reference should be had to the accompanying drawings forming a part of this specification, in which:

Figure 1 is a front elevation of a bushing assembling machine embodying the invention, portions of the machine being broken away and shown in vertical section;

Fig. 2 is a fragmentary vertical section showing a sleeve and insert clamped between the press plunger and crosshead;

Fig. 3 is a fragmentary vertical section showing the bushing completely assembled upon the upper end of the core inserting plunger;

Fig. 4 is a fragmentary vertical section showing the press plunger and crosshead gripping the sleeve and insert and in a position where the small end of the core pilot is in engagement with the rubber insert;

Fig. 5 is a fragmentary central vertical section through the core pilot and the end of the plunger to which it is attached;

Fig. 6 is a fragmentary vertical section showing a modified form of pilot that is expanded by fluid pressure delivered to the interior thereof;

Fig. 7 is a sectional view similar to Fig. 7, showing the pilot inflated;

Fig. 8 is a view similar to Fig. 1 showing the core inserting plunger and the pressure connections modified to accommodate the inflatable pilot shown in Figs. 6 and 7;

Fig. 9 is a vertical sectional view showing another form of fluid pressure actuated pilot; and Fig. 10 is a horizontal section taken on the line indicated at 10—10 in Fig. 9.

The machine of the present invention is designed to assemble a resilient bushing which, as shown in Fig. 3, is composed of an elastic tubular rubber insert A, an outer sleeve B and a tubular core C, the rubber insert being normally of an external diameter greater than the internal diameter of the sleeve and of an internal diameter less than the external diameter of the core C.

The machine has a base 1 supporting spaced vertical standards 2 the upper ends of which are connected by a cross beam 3 which supports a vertically disposed hydraulic cylinder 4 to the piston of which is attached a press plunger 5. The standards 2 support a pair of air cylinders 6 which have downwardly extending pistons 7 attached at their lower ends to a crosshead 8 that underlies the press plunger 5. The cylinders 6 provide air springs for yieldably supporting the crosshead 8 which is guided for vertical movements on spaced vertical guide posts 9 that slide in bearing sleeves 10 carried by the crosshead 8. A vertical plunger 11 extends upwardly from the base 1 and is screwthreaded in a socket 12 for vertical adjustment, being secured in adjusted position by means of a nut 13. Adjacent its upper end the plunger 11 has a reduced core supporting portion 14 upon which a core C slidably fits, a shoulder 15 being provided at the lower end of the core receiving portion 14 to limit the downward movement of the core on the plunger.

The crosshead 8 has a central opening 16 that is axially alined with the plunger 11 and that is of a size to receive the plunger 11. The top face of the crosshead 8 is provided with an insert positioning socket 17 that is concentric with the opening 16 and the lower end of the press plunger 5 is provided with a sleeve receiving socket 18 that is axially alined with the plunger 11 and with the insert positioning socket 17. The socket 18 is provided with one or more ball detents 19 which engage with the exterior surface of a sleeve B to retain it in the socket. Above the socket 18 the plunger 5 is provided with a bore 20 axially alined with the socket 18 that provides the sleeve receiving socket with a central recess of a diameter to receive the core inserting plunger 11.

To assemble a bushing an insert A is placed in the socket 17, a sleeve B is pushed into the socket 18 where it is retained by the detent 19 and a tubular core C is placed upon the reduced portion 14 of the plunger 11 where it is supported by the shoulder 15. When the press plunger 5 is moved downwardly by hydraulic pressure in the cylinder 4, the sleeve B is brought into engagement with the upper end of the insert A and the insert A is forced into the sleeve B, clamping the sleeve and insert as shown in Fig. 2 of the drawings. Continued downward movement of the plunger 5 causes the crosshead 8 to move downwardly in opposition to the air pressure in the cylinder 6, causing the plunger 11 to be advanced through the opening 16 into the insert A to the position shown in Fig. 3. The downward movement of the plunger 5 is limited by a pair of vertically adjustable stop members 21 in the form of threaded bolts screwed into the base 1, the stops 21 being secured in adjusted positions by means of lock nuts 22.

To facilitate the entry of the core C into the insert A, the core inserting plunger 11 carries a tapered expansible pilot 23 above the upper end of the core C. The pilot 23 is normally of a size to permit a core C to pass freely over it onto or out of the core receiving portion 14 of the plunger. The pilot 23 passes through the insert A ahead of the core member C and during its passage through the insert it is expanded at its larger lower end to a diameter at least equal to that of the core C, thereby expanding the insert immediately in advance of the core C to facilitate the entry of the core C into the insert.

As best shown in Figs. 4 and 5, the pilot is attached to the core inserting plunger 11 by means of a rod 24 that is coaxial with the plunger, that is slidable axially in the plunger and that projects above the flat top end face 25 of the plunger. The pilot 23 has an expansible body portion 26 formed of elastic material such as rubber, and which tapers upwardly from its lower end which is normally of a diameter slightly less than the external diameter of the core holding portion 14 of the plunger so that a core C can be readily slipped over the pilot 23 onto or off the supporting portion 14 of the plunger. The expansible body portion 26 of the pilot surrounds the rod 24 and is preferably permanently secured upon a metal sleeve 27 that slides on the rod 24. The upper end of the rod 24 is provided with a retaining flange or collar which can conveniently be provided with nuts 28 that restrain upward movement of the expansible body portion 26 and that form the tip of the core pilot. The sleeve 27 is shorter than the rubber body portion 26, the lower end of which projects past the lower end of the sleeve 27 into engagement with the top end face 25 of the plunger 11. The expansible rubber body portion 26 of the pilot has a reentrant lower end face 29 that tapers upwardly to the lower end of the sleeve 27 so that an axial downward thrust pressing the lower end of the annular rubber body portion 26 against the top end face 25 of the plunger 11 will cause the lower end of the body 26 to expand radially.

A core C is supported on the shoulder 15 with its upper end substantially flush with the top end face 25 of the plunger 11 and the reentrant lower end face 29 of the body 26 provides a recess below the sleeve 27 of a depth such that when the sleeve 27 is pressed downwardly into engagement with the plunger 11 the lower end of the rubber body 26 is expanded radially over the end of the core C and to a diameter substantially the same as the external diameter of the core C as shown in Fig. 4. The sleeve 27 preferably extends to the upper end of the rubber body 26 and may be provided with external ribs 30 to more firmly secure the rubber body 26 to the sleeve. The rod 24 is normally positioned with the nuts 28 spaced from the top face 25 of the plunger 11 far enough to permit the larger lower end of the rubber body to have its normal shape as shown in Fig. 5 so that a core C can be readily slipped over the pilot and into place on the core supporting portion 14 of the plunger.

The pilot 23 is subjected to axial pressure when engaged with the rubber insert A as shown in Fig. 4 and this pressure may serve to expand the pilot. It is preferred, however, to provide positively actuated pressure applying means independent of the axial thrust of the insert A to positively maintain the pilot in its expanded condition during its passage through the rubber insert. As herein illustrated the pilot expanding means is fluid pressure operated and the supply of fluid under pressure to the expanding means is controlled by the movement of the clamped sleeve and insert relative to the core inserting plunger. As shown in Fig. 1, the rod 24 extends entirely through the plunger 11 and is attached at its lower end to a flexible diaphragm 31 in a fluid tight casing 32 attached to the lower end of the plunger. The diaphragm 31 forms a movable bottom wall of a pressure chamber 33 to which fluid under pressure may be delivered through a conduit 34 to apply a downward thrust on the rod 24 to expand the pilot. Fluid under pressure is supplied to the conduit 34 through a valve 35 that is normally held by a spring 36 in a position in which the conduit 34 is connected to an exhaust line 37 and that can be shifted in opposition to the spring 36 to connect the conduit 34 to a pressure line 38. As herein shown, the valve 35 is a spool type valve that is horizontally disposed alongside the path of travel of the crosshead 8 and that has a stem 39 projecting inwardly toward the path of travel of the crosshead.

The valve 35 is moved to the position in which it connects the conduit 34 to the pressure line 38 just before the pilot 23 engages the insert A and is held in this position to maintain pressure in the chamber 33 while the pilot 23 passes through the insert A and is released after the pilot has passed through the insert to permit the pilot to assume its normal shape so as to allow the assembled bushing to pass upwardly over the pilot upon return movement of the crosshead 8. To control the valve 35 to supply pressure to the chamber 33 only during the portion of the stroke in which the core C is being entered into the insert A, the valve stem 39 is provided with a head 40 provided with an upwardly opening recess 41 in which is mounted a vertically swinging arm 42 connected to the head 40 by a horizontal pivot 43 and normally supported in horizontal position on the bottom of the recess 41. The arm 42 carries a roller 44 that is engaged by a cam 45 mounted on the crosshead 8. The cam 45 is rigidly attached to the crosshead 8 and has a laterally extending inclined lower engaging portion 46 that engages with the roller 44 during the downward movement of the crosshead 8 past the valve 35 to shift the valve outwardly against the action of the spring 36. Above the inclined portion 46, the cam has a vertical portion 47 for holding the valve in pressure supplying position during passage of the pilot 23 through the insert and at its upper end the cam has an inturned portion 48. The inclined portion 46 of the cam 45 is positioned to shift the valve to pressure supplying position just prior to engagement of the pilot 23 with the rubber insert and the vertical portion 47 is of the proper length to maintain the pressure in the chamber 33 until after the pilot 23 has passed through the rubber insert. The upper end of the cam 45 moves downwardly past the roller 44 so that the spring 36 can return the valve 35 to its normal pressure relieving position after the pilot 23 has passed through the rubber insert and into the recess formed by the bore 20. When the crosshead 8 moves upwardly, the inturned upper end 48 of the cam engages the roller 44 and swings the arm 42 upwardly so that the valve 35 connects the pressure chamber 33 to the exhaust line during upward movement of the crosshead.

In the operation of the machine the operator places an insert A in the socket 17 on the crosshead 8, a sleeve B in the socket 18 in the lower end of the press plunger 5 and a core C on the supporting portion 14 of the plunger 11. The cylinder 4 is then operated by suitable means (not shown) to impart a reciprocating stroke to the plunger 5. During downward movement of the plunger the sleeve B is brought into engagement with the insert A and the resistance offered by the cylinders 6 to the downward movement of the crosshead 8 causes the insert A to be pressed into the sleeve B as shown in Fig. 3. The downward thrust exerted on the plunger 5 is sufficient to overcome the air pressure in the cylinders 6 so that the crosshead 8 and plunger 5 move simultaneously downwardly toward the plunger 11 with the sleeve and rubber insert clamped between them. As the pilot 23 enters the opening 16 of the crosshead the inclined portion 46 of the cam 45 engages the roller 44 and actuates the valve 35 to supply pressure to the chamber 33 which acts upon the flexible diaphragm 31 to pull the rod 24 downwardly to expand the rubber body portion 26 of the pilot radially over the upper end of the core as shown in Fig. 4. While the core 23 is passing through the rubber insert the valve 35 is held in pressure supplying position by the vertical portion 47 of the cam. Before completion of the down stroke of the crosshead the valve 35 is released and returns to pressure releasing position where it remains during the upward movement of the crosshead 8. As it moves upwardly the crosshead lifts the assembled bushing off the plunger 11. The assembled bushing can then be removed from the crosshead 8 and the parts A, B and C of another bushing can be positioned as above described for the next assembling operation.

As shown in Figs. 6 and 7, a plunger 11a has a reduced core receiving portion 14a and a stepped upper end formed by a lower reduced portion 49 that provides a shoulder 50 at the upper end of the core receiving portion 14a and a reduced portion 51 at its upper end that provides a shoulder 52 at the upper end of the reduced portion 49. A circumferential rib 53 is provided adjacent the lower end of the reduced portion 49, the rib 53 being spaced from the shoulder 50 to provide a circumferential groove 54 immediately above the shoulder 50. An expansible core pilot 23a is mounted on the stepped upper end of the plunger 11a and this pilot has a rigid tip portion 55 that is retained on the upper reduced portion 51 of the plunger by a screw 56. The expansible portion of the pilot is formed by an elastic rubber sleeve 57 that has internal ribs 58 and 59, the rib 58 overlying the upper side of the rib 53 and the internal rib 59 being positioned in the groove 54. At its upper end the sleeve 57 has an inturned flange 60 that is clamped between the tip portion 55 of the pilot and a washer 61 resting on the shoulder 52. The sleeve 57 is normally of an external diameter slightly less than the internal diameter of a core C so that a core C can be readily slipped over the sleeve 57 onto the core supporting portion 14a of the plunger 11a. The core supporting portion 14a is preferably slightly shorter than the core C so that the upper end of a core C when placed on the plunger 11a surrounds the lower end of the rubber sleeve 57.

An annular cavity 62 is provided within the sleeve 57 and around the reduced portion 49 of the plunger between the internal rib 58 and the flange 60 of the sleeve and the plunger 11a is provided with an axial passage 63 opening through lateral passages 64 to the cavity 62 through which fluid under pressure can be delivered to the cavity 62 to inflate the sleeve 57 as shown in Fig. 7. Fluid under pressure is supplied to the cavity 62 to expand the sleeve 57 during its passage through the rubber insert and, to accomplish this result, the plunger 11 and conduit 34 shown in Fig. 1 may be replaced with the plunger 11a and a conduit 34a that is connected to the plunger 11a to deliver fluid under pressure to the passage 63 as shown in Fig. 8, the delivery of fluid under pressure to expand the pilot 23a being controlled by the cam 45 as above described in connection with Fig. 1.

Figs. 9 and 10 of the drawings show a pilot of the expanding cone type that is adapted to be actuated by fluid pressure supplied to the core inserting plunger by the automatically operated valve mechanism shown in Fig. 1. As shown in Fig. 9, a core inserting plunger 11b has a detachable upper portion 65 which serves to support the core C, the portion 65 of the plunger has a core receiving portion 66 of reduced diameter that fits within the core and has a circumferential shoulder 67 at the lower end of the core receiving portion 66 to support the core, the length of the reduced portion 66 corresponding to the length of the core. The lower end portion of the member 65 is hollow and internally threaded to screw onto a threaded projection 68 at the upper end of the body portion of the plunger 11b.

At its upper end the member 65 has an integral axial extension 69 to which an expansible core pilot 23b is attached. The extension 69 has a reduced threaded upper end 70 that provides a shoulder 71 to seat a rigid tip 72 of the expansible pilot 23b. The tip 72 is clamped against the shoulder 71 by a nut 73 on the threaded portion 70. The pilot 23b has an expansible hollow conical body portion 74 that is provided with longitudinal slots 75 that terminate near the upper end thereof. Adjacent the lower end of the conical body portion the segments thereof separated by the slots 75 have upwardly tapering interior faces 76 that engage an upwardly tapering conical expander 77 that is slidable on the extension 69. Upward movement of the expander 77 expands the larger end of the conical body 74 radially outwardly until it overlies the upper end of a core on the plunger as shown in Fig. 9.

The pilot 23b is formed of a resilient metal and is normally of a diameter at its lower end slightly less than the internal diameter of a core C so that a core C can be readily slipped over the pilot 23b onto the plunger and so that an assembled bushing can be lifted off the plunger by the crosshead.

The lower end of the member 65 is provided with an axial bore 78 that receives a piston 79 to which rods 80 are attached which have a sliding fit in the member 65 above the bore 78 and which extend upwardly into engagement with the underside of the expander 77. A spring 81 is interposed between the tip 72 of the pilot and the expander 77 to normally hold the expander in its lowermost position where the conical body of the pilot is of a diameter less than the internal diameter of the core. A fluid pressure passage 63b in the plunger 11b may be supplied with pressure in the same manner as the passeage 63 in the plunger 11a and opens to the lower end of the bore 70 to move the piston 71 upwardly at the proper time during the downward movement of the crosshead 8 to expand the core 23b during its passage through an insert A, the supply of pressure to the passage 34b being controlled by the valve mechanism shown in Fig. 1 of the drawings.

It is to be understood that in accordance with the provisions of the patent statutes, variations and modifications of the specific devices herein shown and described may be made without departing from the spirit of the invention.

What I claim is:

A machine for assembling resilient bushings that have a tubular rubber insert under radial compression between a rigid outer sleeve and a rigid tubular core comprising a plunger having a portion inwardly of one end of a size to fit within the tubular core a shoulder for positioniong the core with its outer end adjacent said end of the plunger, a rod coaxial with said plunger, slidable therein and projecting past said end, a tapered pilot carried by said rod and having a radially expansible body portion inwardly of its tip in the form of a circumferentially continuous annular body of elastic rubber surrounding said rod and attached thereto, said rubber body portion being normally of a diameter no greater than the internal diameter of the core and being radially expansible to a diameter corresponding to the external diameter of said core, said body portion having a reentrant inner end providing an annular end portion for engagement with the end of the plunger that is spaced radially from said rod, means for holding a sleeve with an insert therein in axial alinement with said plunger, means for moving said holding means and plunger relatively axially of said plunger to pass said pilot through the insert, place the core within the insert and retract the pilot through the core of the assembled bushing, and means controlled by axial movement of said plunger relative to the sleeve and insert-holding means for applying an end thrust to said rod to press the inner end of said rubber body portion against the plunger to expand said body portion radially prior to entry of the pilot into the insert and for releasing said rod to permit said body portion to contract to normal diameter prior to return of the pilot through said core.

References Cited in the file of this patent

UNITED STATES PATENTS

| | | |
|---|---|---|
| 788,568 | Welsh | May 2, 1905 |
| 1,039,948 | Hunter | Oct. 1, 1912 |
| 2,550,564 | Hutton | Apr. 24, 1951 |
| 2,604,692 | Broden | July 29, 1952 |
| 2,660,780 | Beck | Dec. 1, 1953 |